May 30, 1961  A. F. JOHNSON  2,986,458
PRODUCTION OF IRON FROM FERROUS SLAG MATERIALS
Filed Sept. 5, 1958
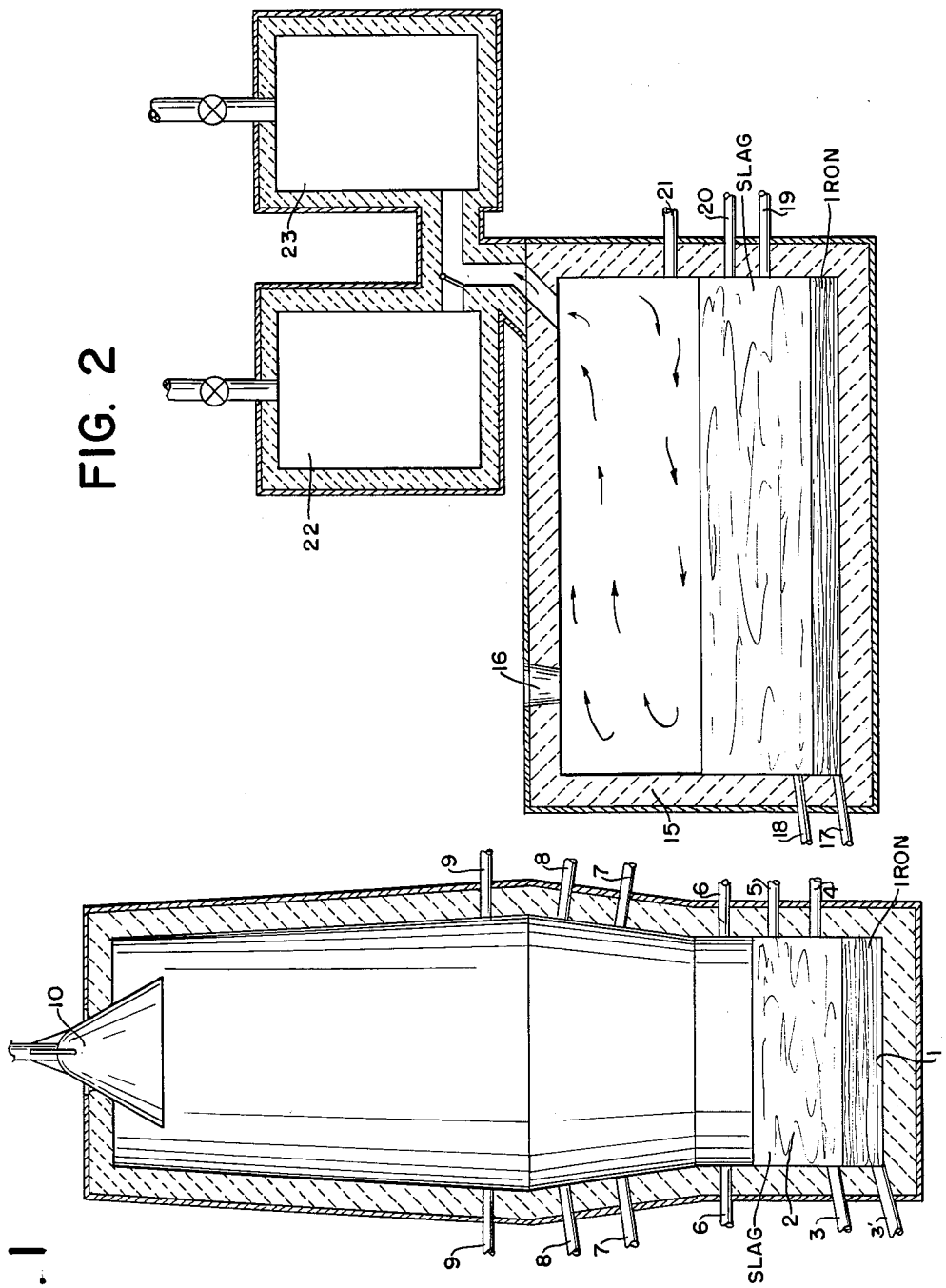
INVENTOR
ARTHUR F. JOHNSON
BY
Pennie, Edmonds, Morton, Barrows & Taylor
ATTORNEYS

United States Patent Office 2,986,458
Patented May 30, 1961

2,986,458
PRODUCTION OF IRON FROM FERROUS SLAG MATERIALS

Arthur F. Johnson, New York, N.Y., assignor to Strategic Materials Corporation, Buffalo, N.Y., a corporation of New York Filed Sept. 5, 1958, Ser. No. 759,215
9 Claims. (Cl. 75—40)

This invention relates to the pyrometallurgy of iron, and has for its object the provision of an improved process for reducing iron oxides to produce iron or steel. The invention is primarily concerned with the reduction of iron silicate slags including fayalite, an iron oxide-silica composition represented by the formula $$2FeO \cdot SiO_2$$

The iron silicate slag may be derived from such operations as power plant boilers, copper reverberatory smelters, or from operations carried out in the blast furnace or open-hearth furnace so as to favor the formation of an iron silicate slag.

In accordance with my invention, I subject a molten iron silicate slag to reduction with a hydrocarbon gas at an elevated temperature which is injected into the slag. I prefer to inject hot powdered lime as a fluxing agent into the slag alone either with the gas or with preheated air. Advantageously, I may use the reducing gas or air as a carrier medium for the pulverulent lime which is injected into and mixed with the slag. It is important to preheat the hydrocarbon gas to an appreciable temperature to effect the reduction, and to use an excess of the gas so some of it may be burned by the oxygen in the slag and above it for heating purposes. When reduction temperatures are reached, the hydrocarbon gas reduces the iron oxide, and, at higher temperatures, manganese oxide, and since some of the hydrocarbon gas is not completely oxidized in the slag, oxygen or air is introduced either into the slag or above the upper surface of the slag to burn the combustible gas and in this way heat the slag.

As a hydrocarbon gas I may use natural gas which is largely methane, or any gaseous hydrocarbon petroleum product. The hydrocarbon gas liberates enough heat for the reduction; about 50,000 cubic feet of methane will reduce a ton of metallic iron. When powdered lime is blown into the slag with the hydrocarbon gas, the iron oxide is reduced and the lime combines with the released silica in an exothermic reaction adding to the heat of the charge and forming a calcium silicate slag. This combination of agents gives a conjoint action which is responsible for the efficient reduction of iron oxide in the process of the invention. The reaction is shown below:

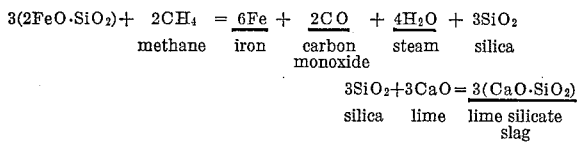

The underlined products are the final products. Any sulfur contained in the charge will react with the lime to form calcium sulfide.

The dispersion of the lime by the gas tends to drive the reaction to completion and an excess of hydrocarbon gas also has this tendency since the use of an excess produces some free hydrogen. An important feature of my invention is the utilization of the fuel value of the excess reducing gas as well as the sensible heat therein after it has preformed its reduction of the iron. In my process the combustible gas escaping from the slag surface consisting of carbon monoxide and hydrogen is burned above the slag either to heat the roof and walls of the furnace or, in the case of a blast furnace, the charge in the stack, before it is discharged into the heat exchangers for preheating the hydrocarbon gas and air.

Where it is a problem to keep the sulfur content of the iron low, I prefer to treat the slag in batches as the slag may be raised to reduction temperature (1300° to 1650° C.) under oxidizing conditions before the iron is reduced to eliminate the sulfur as a gas ($SO_2$). In this way sulfur present in the gas, such as natural gas, is retained by the iron to a minimum amount.

The lime is preferably preheated to a temperature of about 1000° C. and fluorspar dolomite, magnesite or alumina may be used, also preferably heated, to supplement the lime and lessen the amount thereof needed. I find it advantageous to introduce white hot lime into the slag so as to combine with the sulfur therein before the lime reacts with the silica of the furnace charge and loses its ability to combine with sulfur. When using the lime in the high temperature range I prefer to mix the lime with the air as higher temperatures can then be used. It is important when using the hydrocarbon gas as a carrier for the lime that the temperature and period of contact be such that no objectionable decomposition of the gas takes place.

The invention provides a modified blast furnace operation in which the present use of limestone and coke is either entirely or practically eliminated with a consequent great increase in the furnace capacity since both limestone and coke are bulky materials taking up more space than the iron ore. Moreover, these materials absorb much heat before the reaction temperature is reached.

In accordance with one aspect of my process which pertains to the operation of the blast furnace, the furnace is modified to provide nozzles for the introduction of the hydrocarbon gas, lime fluxing agent, and air or oxygen at the desired places in the furnace. In the blast furnace, the iron silicate slag is derived from the siliceous iron ore charged into the furnace. As the charge is heated in the stack and melted in the bosh area, some reduction takes place. The escaping excess and combustible gas is burned above the slag to heat the iron oxide in the shaft, and reducing gases are passed in contact with this heated iron oxide ore to reduce the $Fe_2O_3$ or $Fe_3O_4$ to FeO before it reaches the hearth where the iron silicate slag is formed. The iron silicate slag is accumulated on the hearth of the blast furnace, and the hydrocarbon gas in excess of the amount required for reduction, and lime are injected into this slag to reduce the iron oxide and flux the silica.

In conventional blast furnace practice iron is tapped out of the blast furnace every four to six hours more or less, after which slag is run out until gas issues from the tap hole. In my invention I prefer to use a tap hole for slag located just above the highest level of accumulated iron so that an acid calcium silicate slag of about the composition of conventional blast furnace slags which is formed at this stage may be tapped out ahead of the iron. Then, after tapping out this acid slag, I blow in an excess quantity of lime to form a high lime iron silicate slag that is on the basic side for a short period of time. I may do this by blowing lime through the tuyeres with an oxygen-enriched blast while at the same time lessening the charging of hydrocarbon gas to decrease the amounts of carbon, silicon, sulfur and phosphorus from the cast iron while producing carbon monoxide which is released to reduce iron in the blast furnace stack. After this high oxygen blow and high lime slag I tap steel or semi-steel out of the blast furnace followed by a high lime slag containing phosphorus and sulfur in greater percentages than possible in conventional blast furnace practice.

In another variation of my process, an iron silicate slag, as from a copper reverberatory furnace, or a boiler operated with a "wet bottom," is charged into an open-hearth type furnace for reduction with the hydrocarbon gas and lime.

In the accompanying drawings:

Fig. 1 is a sectional elevation diagrammatically illustrating a modified blast furnace for carrying out a process of the invention; and Fig. 2 is a sectional elevation of a modified open-hearth type furnace for carrying out another operation of the invention.

The blast furnace illustrated in Fig. 1 comprises a hearth 1 where the iron accumulates, a slag-collecting area 2 thereabove having a slag top hole 3 just above the highest iron level, and ports or nozzles 4 and 5 for charging or injecting into the slag air (preferably preheated) or oxygen, and preheated hydrocarbon gas. The usual bosh area is located just above tuyeres 6 through which an oxygen-containing gas or hydrocarbon gas is injected to effect heating melting and reduction of the iron oxide of the charge, especially to reduce $Fe_2O_3$ and $Fe_3O_4$ to FeO above the slag. Farther up in the stack the nozzles 7 are mounted for introducing a limited amount of oxygen to burn any combustible gas escaping from the slag and bosh areas. Still farther up are nozzles 8 for introducing preheated hydrocarbon gas to serve both as reducing agent and fuel. And still farther up other nozzles 9 are arranged for injecting oxygen into the charge to burn combustible gases passing upward for the purpose of heating the incoming charge. The charge may contain a small amount of coke mainly for the purpose of consuming any excess oxygen that may escape the operations below. The gases which leave the upper part of the stack are passed through the usual heat-exchange stoves in the usual way and the heat of these stoves is used to preheat the air and hydrocarbon gas.

In carrying out an operation in the blast furnace of Fig. 1 a siliceous iron ore with or without a small amount of coke and limestone, up to 5% each by weight of the total charge, is introduced through the feed cone 10 in the usual way. It is understood that the entire stack is maintained completely filled. At the bottom of the furnace is an accumulated body of reduced iron and an overlying layer of slag.

When the iron oxide and silica components of the slag move downwardly through the furnace and ultimately are fused into the molten slag which accumulates above the iron it consists largely of an iron oxide and silica composition which may be similar to fayalite. After there has been a desired accumulation of this slag, the preheated hydrocarbon gas at a temperature above 200° C., preferably above 400° C., is injected through nozzles 4 into the slag. Under the prevailing temperatures the hydrocarbon gas reduces the iron oxide to iron. In a variation of the operation, finely divided and highly heated lime, preferably at a temperature above 1000° C., is blown through the same nozzle with the air and dispersed into the slag. In another variation of the operation the heated lime is charged into the slag with the hydrocarbon gas. However, care must be taken not to use such hot lime or such period of contact with the hydrocarbon gas that it will decompose and release objectionable amounts of carbon before reaching the slag. As a result of the conjoint action of the reducing agent and the affinity that the lime has for the silica component of the slag the iron oxide is reduced and a calcium silicate slag is formed. Any sulfur present in the slag will combine with the lime and form calcium sulfide. Although the reaction of the lime with the silica is exothermic and liberates a substantial quantity of heat there is not a sufficient quantity of such heat to retain the reducing conditions in the slag and it is accordingly necessary to use an excess of hydrocarbon gas and to introduce into the slag, as through nozzle 5, either preheated air or oxygen. In any event, there is only a sufficient amount of oxygen-containing gas charged into the slag to react with some of the combustible gases and increase the temperature, while maintaining reducing conditions. In a preferred operation, there is an appreciable quantity of partially oxidized but nevertheless combustible gas escaping from the slag and passing into the iron oxide charge immediately above. In order to facilitate a reduction of the iron oxide above the slag, which exists as $Fe_2O_3$ and $Fe_3O_4$, to FeO and also to fuse this iron oxide and silica to form the iron silicate slag, additional hydrocarbon gas, preferably preheated, and either preheated air or oxygen are injected through the tuyeres 6. Although there is a substantial amount of combustion in this zone there is, nevertheless, such a control over the amounts used as to provide a considerable amount of residual combustible reducing gas passing upwardly in the charge. Some of this gas may be burned by introducing a small amount of oxygen through the nozzles 7. Although it may not be necessary to charge an additional quantity of preheated hydrocarbon gas through the nozzles 8 and also a minor amount of oxygen through the nozzles 9 to burn this gas, these provide an additional measure of control for extending the area of reduction and the temperature for reduction farther up into the charge.

It will be noted that the slag tap hole 3 is located above the normal level of the iron. When the fayalite slag has been completely reduced, as previously described, and consists mainly of acid calcium silicate together with some calcium sulfide, the slag is tapped out, the charging of hydrocarbon is lessened, and the oxygen-containing gas is charged into the slag zone. This oxidizing high-lime iron oxide overlying the iron oxidizes both the carbon and the silicon of the iron very appreciably and may be carried out to such an extent that the usual cast iron is converted into semi-steel. At the conclusion of this operation the iron is tapped from the furnace through tap hole 3' followed by the high-lime iron silicate slag containing phosphorous and sulfur.

The apparatus illustrated in Fig. 2 is particularly suitable for the reduction of iron silicate slags derived either from natural sources or from other operations. Such slags may be derived from power plant boilers, copper reverberatory furnaces or from slags resulting from the production of iron. The slag is most advantageously obtained in the molten state and poured into the furnace 15 through the port 16 for batch treatment. The furnace may be any suitable refractory lined vessel such as an open hearth furnace having a lower tap hole 17 for removing iron and an upper tap hole 18 for removing slag. At one side of the furnace a nozzle 19 is provided to blow preheated air or oxygen, with or without preheated pulverized lime, into the slag, and another nozzle 20 is provided to blow preheated hydrocarbon gas, with or without pulverized lime, into the slag. In either case, pulverized lime and in a heated state, say about 1000° C., is charged into the slag with either the air or the hydrocarbon gas. At a position located above the normal slag level, another nozzle 21 is provided to introduce preheated air or oxygen to burn any combustible gases escaping from the slag. Any desired number of nozzles 19, 20 and 21 may be arranged in the furnace.

The furnace is preferably provided with the conventional type of stoves 22 and 23 for the purpose of utilizing the hot combustion gases from the furnace to preheat both the hydrocarbon gas and the air.

In a typical operation carried out in the apparatus of Fig. 2 a molten iron silicate slag, such as from a copper reverberatory smelter, or a steam boiler operated with a "wet bottom" is poured into the furnace through port 16 and the preheated hydrocarbon gas with entrained preheated pulverized lime is injected into the slag.

As stated above in connection with the operation of the blast furnace, the hydrocarbon gas is heated to a temperature of at least 200° C. and when air is used to provide oxygen, it is heated to a temperature of at least 800° C. The lime is also preheated, preferably to a temperature of at least 700° C. Also, as in the operation carried out in the blast furnace the lime is a necessary agent in the operation not only because of its capacity to combine with silica and sulfur but because of its exothermic reaction with silica. However, the lime may be supplemented by using small amounts of magnesium oxide (in the form of dolomite or magnesite), fluorspar or alumina.

As a result of the conjoint action of the lime and the reducing gas the iron oxide is reduced to iron and the released silica is combined with the lime forming calcium silicate slag. Any manganese oxide that may be present in this slag will undergo a similar reduction. Also any sulfur that is contained in the slag will combine with the lime to form calcium silicate that enters the slag. Although the reaction of calcium and silica is exothermic some additional heating may be provided by introducing a controlled amount of preheated air or oxygen into the slag to burn some of the hydrocarbon gas while maintaining reducing conditions. The reduction reactions are controlled such that carbon monoxide is released from the slag together with some excess unreduced hydrocarbons and these gases are burned above the slag by either the preheated air or oxygen blown in through nozzle 21. These gases contain a considerable amount of heat which is recovered in the stoves in the usual manner in preheating the hydrocarbon gas and air.

After the iron oxide, and any manganese oxide present, have been reduced the calcium silicate slag is tapped out of the furnace through the hole 18. Unless the body of iron has reached a proper volume an additional batch of iron silicate slag is poured into the furnace. This oxidizing slag together with any oxygen that may be introduced into it through nozzle 19 will serve to oxidize carbon and silicon contained in the iron and thereby affect a material diminution in the amounts of these elements. In other words, the slag may be subjected to oxidizing conditions to convert what would ordinarily be pig iron into a semi-steel.

I claim:

1. In a metallurgical process for the production of low-sulfur iron from a slag which consists mainly of iron silicate by blowing into the slag a hydrocarbon gas and pulverulent lime, the improvement that comprises charging said slag over a pool of molten iron, said pool acting to collect the iron subsequently reduced from said slag, and preheating said hydrocarbon gas to at least 200° C. and said lime to at least 700° C. prior to said blowing to establish and maintain said slag in a fluid state and to effect combination of said lime with any sulfur present as well as with silica released by reduction of iron oxide from said slag.

2. The process as claimed in claim 1, wherein an excess of said hydrocarbon gas over the stoichiometric quantity required for reduction of said iron oxide is blown into said lag, and an oxygen-containing gas is separately introduced near said slag to burn combustible gas escaping therefrom.

3. The process as claimed in claim 1, wherein said slag is selected from the group consisting of copper reverberatory furnace slag, slag from a "wet bottom" boiler, and an ore containing iron oxide and silica.

4. The process as claimed in claim 2, wherein said oxygen-containing gas is preheated to a temperature of at least 800° C.

5. In the operation of a blast furnace, the improved process that comprises charging silicious iron ore into the top of the furnace, forming a pool of reduced iron at the bottom of the furnace and a molten iron silicate slag over the iron, blowing through nozzles and into the slag a hydrocarbon gas preheated to at least 200° C. to reduce the iron oxide in said slag and pulverulent lime preheated to at least 700° C. to combine with any sulfur in said slag as well as with silica released by reduction of iron oxide from said slag, effecting the production of low-sulfur iron and a calcium silicate slag, and periodically tapping said iron and said slag from said furnace.

6. The process as claimed in claim 5, wherein an excess of said hydrocarbon gas over the stoichiometric quantity required for reduction of said iron oxide is blown into said slag, and an oxygen-containing gas is separately introduced into the body of the iron ore in the furnace above said slag to burn combustible gas escaping from the slag and to increase the temperature thereof.

7. The process as claimed in claim 5, wherein a combustible gas and oxygen are separately blown into the iron ore above the slag to increase the temperature and effect partial reduction of the iron oxide.

8. The process as claimed in claim 5, wherein small amounts of coke and limestone, the amounts of which are insufficient, respectively, to reduce the iron oxide and flux the silica, are included with the charge of iron ore.

9. The process as claimed in claim 5, wherein an oxidizing gas selected from the group consisting of preheated air and oxygen is blown into said slag and reduced iron, to remove carbon and silicon from said iron, and to effect the production of semi-steel.

References Cited in the file of this patent

UNITED STATES PATENTS

| | | |
|---|---|---|
| 453,227 | Wilson | June 2, 1891 |
| 723,501 | Thofehrn | Mar. 24, 1903 |
| 828,583 | Thiel | Aug. 14, 1906 |
| 1,043,371 | Sundberg | Nov. 5, 1912 |
| 1,319,061 | Garred | Oct. 21, 1919 |
| 1,471,270 | Kuzell | Oct. 16, 1923 |
| 2,820,706 | Larson | Jan. 21, 1958 |

FOREIGN PATENTS

| | | |
|---|---|---|
| 444,809 | France | Aug. 17, 1912 |
| 396,690 | Great Britain | July 31, 1933 |
| 622,419 | Great Britain | May 2, 1949 |